R. H. PORTEOUS.
RESILIENT TIRE.
APPLICATION FILED JAN. 13, 1917.

1,263,700. Patented Apr. 23, 1918.

Inventor
Robert H. Porteous

By
George H. Bruce
Attorney

UNITED STATES PATENT OFFICE.

ROBERT H. PORTEOUS, OF PASSAIC, NEW JERSEY.

RESILIENT TIRE.

1,263,700.  Specification of Letters Patent.  Patented Apr. 23, 1918.

Application filed January 13, 1917. Serial No. 142,172.

*To all whom it may concern:*

Be it known that I, ROBERT H. PORTEOUS, a citizen of the United States of America, residing at Passaic, in the county of Passaic and State of New Jersey, have invented certain new and useful Improvements in Resilient Tires, of which the following is a specification.

This invention has for its object to provide a novel resilient tire for automobiles and similar vehicles in which the resiliency is secured by the use of spring metal and without the use of air, as is common in pneumatic tires. The advantage of this is that the tire cannot be rendered inoperative by puncturing and it does not require as much rubber in its manufacture and can, therefore, be made much more cheaply than the ordinary pneumatic tires with the present prevailing high prices of rubber.

The features wherein my invention resides will be hereinafter described and then pointed out in the appended claims.

Figure 1:
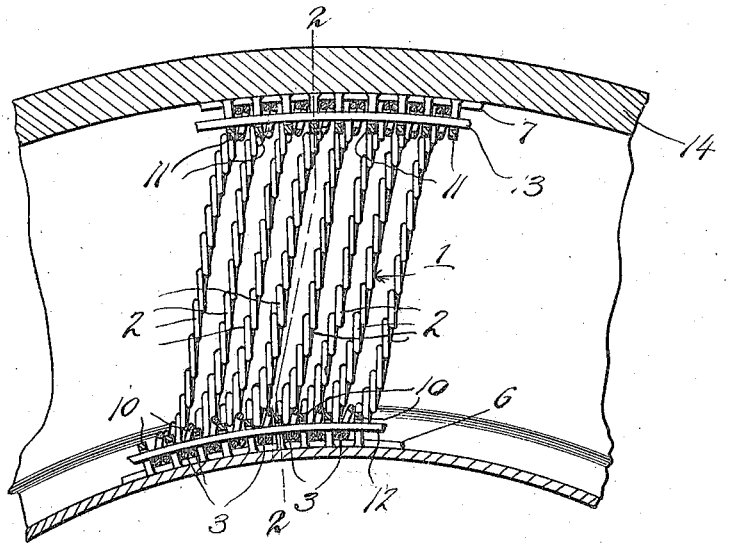
Figure 1 is a longitudinal section of a tire made in accordance with my invention.
Figure 2:
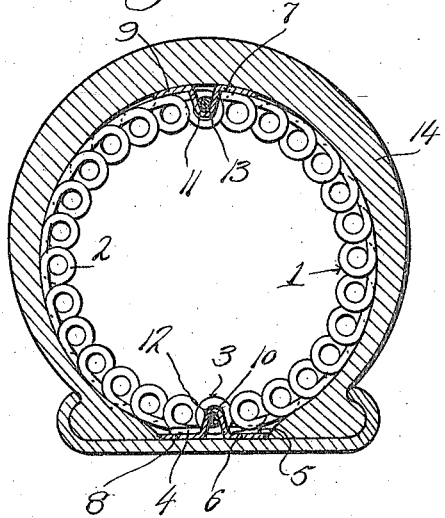
Fig. 2 is a section on the line 2—2 of Fig. 1.

Referring more specifically to the drawings in which like reference numerals indicate like parts throughout the several views, 1 represents a hollow resilient core composed of a plurality of circular resilient elements 2, formed of strong flexible and resilient material such as spring wire or the like. The resilient elements are separately formed from suitable lengths of wire, bent or coiled intermediate its ends to provide consecutively arranged small loops 3. These small loops add greatly to the resiliency of the individual resilient elements 2 and to the core 1 as a whole as will be readily seen.

The free ends 4 and 5 of each resilient element 2 are arranged in relative overlapping relation, the small loops 3 adjacent the ends being in register. Likewise the small loops 3 of one resilient element 2 are in register with the small loops of the next adjacent resilient element. Thus the small loops 3 are arranged in alined circular rows.

A pair of similarly formed inner and outer annular plates 6 and 7 encompass the hollow core 1 and securely lock the resilient elements 2 together. The plates 6 and 7 comprise substantially flat parallel side members 8 and 9 respectively, connected by spaced integrally formed centrally disposed substantially V-shaped straps 10 and 11. When these plates are in position about the core 1, as best illustrated in Fig. 1, the straps 10 of the inner plate 6 interfit between the overlapping or end loops 3 formed on the free ends of the resilient elements, the loops extending into the spaces between the straps. A retaining element 12 preferably a band of wire is then threaded through the row of overlapping loops and through those portions of the straps 10 projecting within the loops. The free ends 4 and 5 of the resilient elements 2 rest upon the wings 8 of plate 6.

The other plate 7 is preferably arranged in a similar manner to that just described preferably diametrically opposite to the plate 6, a wire band 13 being employed to lock the straps 11 to an alined row of loops 3.

A rubber shoe or tread 14 of usual construction incloses the core 1 for the purpose of eliminating noise, incident to travel over rough roads, but it has been found by actual tests that a rubber tread does not add materially to the resiliency of the tire.

Figure 3:
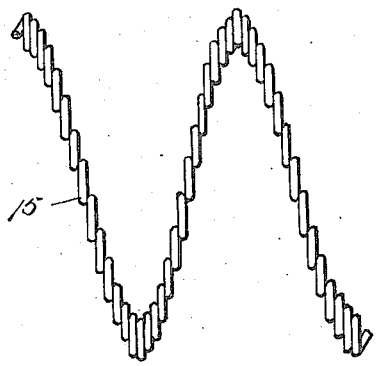
Fig. 3 is a fragmentary view of a modified form of core.
Figure 4:
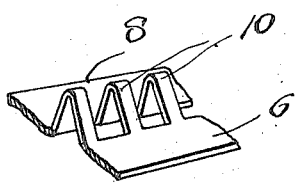
Fig. 4 is a perspective view of a portion of one of the annular plates 6—7.

Fig. 3 illustrates a modified form of invention wherein the separately formed resilient elements 2 are replaced by a core 15 formed of a resilient wire or the like, wrapped closely into substantially spiral form. Inner and outer plates 6 and 7 and retaining bands or wires 12 and 13 are employed as in the preferred form of the invention.

As many changes could be made in the above construction and many apparently widely different embodiments of my invention, within the scope of the claims without departing from the spirit or scope thereof, it is intended that all matter contained in the accompanying specification and drawings shall be interpreted as illustrative and not in a limiting sense.

Having thus described my invention what I claim is:

1. A vehicle tire comprising a plurality of substantially circular resilient elements, inner and outer retaining plates having straps interfitting between said elements, and retaining bands threaded through said resilient elements and through said straps to lock said resilient elements and straps together.

2. A vehicle tire comprising a resilient hollow core, a retaining plate comprising side members and centrally disposed spaced straps connecting said side members, said straps projecting into the interior of said core, and means for locking said core and plate together.

In testimony whereof I affix my signature in presence of two witnesses.

ROBERT H. PORTEOUS.

Witnesses:
GILBERT T. GALE,
JOHN E. HAGER.

Copies of this patent may be obtained for five cents each, by addressing the "Commissioner of Patents, Washington, D. C."